(12) United States Patent
Zollinger et al.

(10) Patent No.: US 11,465,238 B2
(45) Date of Patent: Oct. 11, 2022

(54) GAS GUIDE, LASER CUTTING HEAD AND LASER CUTTING MACHINE

(71) Applicant: BYSTRONIC LASER AG, Niederönz (CH)

(72) Inventors: Roland Zollinger, Brittnau (CH); Michael Held, Heimiswil (CH); Christian Reinmann, Herzogenbuchsee (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 17/414,818

(22) PCT Filed: Feb. 13, 2020

(86) PCT No.: PCT/EP2020/053778
§ 371 (c)(1),
(2) Date: Jun. 16, 2021

(87) PCT Pub. No.: WO2020/165354
PCT Pub. Date: Aug. 20, 2020

(65) Prior Publication Data
US 2022/0040788 A1 Feb. 10, 2022

(30) Foreign Application Priority Data
Feb. 13, 2019 (DE) ............. 10 2019 103 659.3

(51) Int. Cl.
*B23K 26/14* (2014.01)
*B23K 26/38* (2014.01)

(52) U.S. Cl.
CPC ......... *B23K 26/1476* (2013.01); *B23K 26/38* (2013.01)

(58) Field of Classification Search
CPC ............. B23K 26/1476; B23K 26/38
(Continued)

(56) References Cited

U.S. PATENT DOCUMENTS 2,874,265 A * 2/1959 Reed ............... B23K 10/00
75/10.4
3,015,127 A * 1/1962 Stalego ............ C03B 37/06
264/DIG. 75
(Continued)

FOREIGN PATENT DOCUMENTS

DE 102012025627 A1 5/2015
JP 2000225488 A 8/2000
(Continued)

OTHER PUBLICATIONS

International Preliminary Report on Patentability, from PCT/EP2020/053778 filed Feb. 13, 2020, dated May 27, 2021.
(Continued)

*Primary Examiner* — Jimmy Chou
(74) *Attorney, Agent, or Firm* — Workman Nydegger (57) ABSTRACT

The invention relates to a gas guide (11, 11a, 11b, 11c) for a laser cutting head (10) having a nozzle (19), having a central flow axis (S), comprising a base part having a pressure chamber (24) concentrically surrounding the flow axis (S), configured for the reception of a gas flow (20a, 20b, 20c), wherein the base part has at least four gas conduits (26a, 26b, 26c), which extend from the pressure chamber (24) in the direction of the flow axis (S), and wherein the cross-sections of the pressure chamber (24) and the gas conduits (26a, 26b, 26c) are dimensioned such that the gas has a maximum flow rate when it exits the gas conduits.

14 Claims, 4 Drawing Sheets

(58) Field of Classification Search
USPC ............... 219/121.6, 121.67, 121.84, 121.86
See application file for complete search history.

(56) References Cited

U.S. PATENT DOCUMENTS

| | | | | |
|---|---|---|---|---|
| 3,503,804 | A * | 3/1970 | Schneider | B05B 7/228 134/1 |
| 3,525,474 | A * | 8/1970 | Mills | F04F 5/466 15/409 |
| 3,567,898 | A * | 3/1971 | Fein | H05H 1/34 219/121.48 |
| 3,569,660 | A * | 3/1971 | Houldcroft | B23K 26/147 219/121.68 |
| 4,000,392 | A * | 12/1976 | Banas | B23K 26/0643 219/121.63 |
| 4,010,345 | A * | 3/1977 | Banas | B08B 15/04 219/121.84 |
| 4,027,137 | A * | 5/1977 | Liedtke | B23K 26/123 219/121.7 |
| 4,031,351 | A * | 6/1977 | Martin | B23K 26/12 219/121.67 |
| 4,047,580 | A * | 9/1977 | Yahiro | E02F 3/90 175/67 |
| 4,078,167 | A * | 3/1978 | Banas | B23K 10/02 219/121.11 |
| 4,121,085 | A * | 10/1978 | Diemer | C08F 2/005 219/121.74 |
| 4,125,757 | A * | 11/1978 | Ross | B23K 26/14 219/121.67 |
| 4,288,678 | A * | 9/1981 | La Rocca | B23K 26/0643 219/121.65 |
| 4,324,972 | A * | 4/1982 | Furrer | B23K 26/02 219/121.63 |
| 4,642,445 | A * | 2/1987 | Stol | B23K 26/12 219/121.84 |
| 4,672,171 | A * | 6/1987 | Cusimano | B05B 7/226 219/121.48 |
| 4,724,299 | A * | 2/1988 | Hammeke | B05B 7/1486 219/121.6 |
| 4,764,656 | A * | 8/1988 | Browning | B23K 9/296 219/121.44 |
| 4,992,643 | A * | 2/1991 | Fuerschbach | B23K 26/1435 219/121.63 |
| 5,237,150 | A * | 8/1993 | Karube | B23K 26/0643 219/121.72 |
| 5,239,552 | A * | 8/1993 | Okuyama | B23K 26/1476 372/58 |
| 5,285,045 | A * | 2/1994 | Ito | B23K 26/06 219/121.76 |
| 5,356,081 | A * | 10/1994 | Sellar | B23K 26/142 241/1 |
| 5,359,176 | A * | 10/1994 | Balliet, Jr | B23K 26/1476 219/121.67 |
| 5,418,350 | A * | 5/1995 | Freneaux | B05B 7/228 219/121.64 |
| 5,609,781 | A * | 3/1997 | Kaga | B23K 26/032 219/121.67 |
| 5,660,748 | A * | 8/1997 | Tanaka | B23K 26/06 219/121.6 |
| 5,705,785 | A * | 1/1998 | Dykhno | B23K 28/02 219/121.45 |
| 5,728,993 | A * | 3/1998 | O'Neill | B23K 26/0604 219/121.67 |
| 5,756,962 | A * | 5/1998 | James | B23K 26/064 219/121.75 |
| 5,866,870 | A * | 2/1999 | Walduck | B23K 28/02 219/121.45 |
| 5,902,499 | A * | 5/1999 | Richerzhagen | B23K 26/0648 219/121.84 |
| 5,981,901 | A * | 11/1999 | La Rocca | B23K 26/123 219/121.63 |
| 6,118,097 | A * | 9/2000 | Kaga | B23K 26/1435 219/121.5 |
| 6,144,010 | A * | 11/2000 | Tsunemi | B08B 7/0042 219/121.68 |
| 6,172,323 | B1 * | 1/2001 | Ishide | B23K 26/1476 219/121.5 |
| 6,198,070 | B1 * | 3/2001 | Nakayama | B23K 26/1476 219/121.68 |
| 6,204,475 | B1 * | 3/2001 | Nakata | B23K 26/147 219/121.84 |
| 6,248,972 | B1 * | 6/2001 | Yamaguchi | B23K 10/00 219/121.39 |
| 6,268,583 | B1 * | 7/2001 | Yamaguchi | B23K 10/00 219/121.52 |
| 6,313,432 | B1 * | 11/2001 | Nagata | B23K 26/14 219/121.67 |
| 6,316,743 | B1 * | 11/2001 | Nagahori | B23K 26/04 219/121.67 |
| 6,388,227 | B1 * | 5/2002 | Dykhno | B23K 26/348 219/121.6 |
| 6,494,965 | B1 * | 12/2002 | Walker | B08B 5/02 134/104.2 |
| 6,525,291 | B1 * | 2/2003 | Sanders | B26F 3/004 219/121.39 |
| 6,583,383 | B2 * | 6/2003 | Higashi | B23K 26/18 219/121.72 |
| 6,744,005 | B1 * | 6/2004 | Beyer | C23C 26/02 219/121.64 |
| 6,791,061 | B2 * | 9/2004 | Fujii | B23K 26/123 219/121.75 |
| 6,822,187 | B1 * | 11/2004 | Hermann | B23K 26/0884 219/121.63 |
| 6,833,222 | B1 * | 12/2004 | Buzerak | G03F 1/64 156/267 |
| 7,038,161 | B2 * | 5/2006 | Aubry | B23K 26/0665 219/121.63 |
| 7,223,935 | B2 * | 5/2007 | Wessner | B23K 26/0643 219/121.64 |
| 7,605,346 | B2 * | 10/2009 | Harris | B23K 26/34 219/121.84 |
| 7,626,136 | B2 * | 12/2009 | Sato | B23K 26/144 219/121.84 |
| 7,863,542 | B2 * | 1/2011 | Murase | B23K 26/16 219/121.68 |
| 8,134,098 | B2 * | 3/2012 | Muratsubaki | B23K 26/146 219/121.67 |
| 8,344,285 | B2 * | 1/2013 | Sykes | B23K 26/12 219/121.68 |
| 8,710,400 | B2 * | 4/2014 | Briand | B23K 26/0648 219/121.67 |
| 8,735,769 | B2 * | 5/2014 | Miyagi | B23K 26/144 219/121.64 |
| 8,857,733 | B1 * | 10/2014 | Galbraith | C23C 4/12 239/132.5 |
| 8,940,218 | B1 * | 1/2015 | Lindblad | B23K 26/0861 264/400 |
| 8,974,272 | B2 * | 3/2015 | Mornan | F24F 7/025 454/23 |
| 9,061,304 | B2 * | 6/2015 | Miller | B23K 26/142 |
| 10,022,820 | B2 * | 7/2018 | Gaebelein | B23K 26/1462 |
| 10,092,980 | B1 * | 10/2018 | Gaebelein | B23K 26/1417 |
| 10,112,261 | B2 * | 10/2018 | Ohno | B33Y 40/00 |
| 10,220,473 | B2 * | 3/2019 | Ohno | B33Y 40/00 |
| 10,279,417 | B2 * | 5/2019 | Jogdand | B23K 10/006 |
| 10,525,554 | B2 * | 1/2020 | Orlandi | B23K 26/1476 |
| 10,654,129 | B2 * | 5/2020 | Broghammer | B23K 26/142 |
| 10,780,634 | B2 * | 9/2020 | Ohno | B33Y 10/00 |
| 10,814,424 | B2 * | 10/2020 | Izumi | B23K 26/0648 |
| 10,850,350 | B2 * | 12/2020 | Obara | C23C 4/123 |
| 11,040,412 | B2 * | 6/2021 | Jogdand | H05H 1/3405 |
| 2002/0003133 | A1 * | 1/2002 | Mukasa | B23K 26/044 219/121.84 |
| 2002/0008090 | A1 * | 1/2002 | Mukasa | B23K 26/22 219/121.63 |
| 2002/0023905 | A1 * | 2/2002 | Fukaya | B23K 26/1476 219/121.71 |
| 2002/0179582 | A1 * | 12/2002 | Reichmann | B23K 26/0665 219/121.84 |

(56) References Cited

U.S. PATENT DOCUMENTS

| | | | |
|---|---|---|---|
| 2003/0192865 A1* | 10/2003 | Cole, III | B23K 26/1436 219/121.67 |
| 2003/0197909 A1* | 10/2003 | Beyer | B23K 26/1494 359/509 |
| 2003/0217809 A1* | 11/2003 | Morishige | B23K 26/03 156/345.5 |
| 2004/0112882 A1* | 6/2004 | Miyairi | B23K 26/1476 219/121.86 |
| 2004/0188397 A1* | 9/2004 | Connally | B23K 10/00 219/121.67 |
| 2004/0232123 A1* | 11/2004 | Alfille | B23K 26/073 219/121.72 |
| 2005/0056628 A1* | 3/2005 | Hu | B23K 26/144 219/121.84 |
| 2005/0103763 A1* | 5/2005 | Momose | B23K 26/142 219/121.69 |
| 2005/0109744 A1* | 5/2005 | Baker | B23K 26/10 219/121.84 |
| 2005/0109745 A1* | 5/2005 | Wessner | B23K 26/0643 219/121.84 |
| 2005/0133486 A1* | 6/2005 | Baker | B23K 26/0096 219/121.63 |
| 2005/0189331 A1* | 9/2005 | Millard | B23K 26/1436 219/121.84 |
| 2005/0211687 A1* | 9/2005 | Sonoda | B23K 28/02 219/137 R |
| 2006/0043075 A1* | 3/2006 | Hershcovitch | B23K 15/10 219/121.36 |
| 2006/0163216 A1* | 7/2006 | Brandt | H05H 1/34 219/121.39 |
| 2007/0012668 A1* | 1/2007 | Kubo | B23K 26/16 219/121.84 |
| 2007/0012669 A1* | 1/2007 | Mori | B23K 26/123 219/121.84 |
| 2007/0119833 A1* | 5/2007 | Briand | B23K 26/1436 219/121.72 |
| 2007/0119834 A1* | 5/2007 | Briand | B23K 26/123 219/121.72 |
| 2007/0119837 A1* | 5/2007 | Nishiya | B23K 26/146 219/121.84 |
| 2007/0145026 A1* | 6/2007 | Murase | B23K 26/16 219/121.84 |
| 2007/0278195 A1* | 12/2007 | Richerzhagen | B23K 26/0665 219/121.69 |
| 2008/0041832 A1* | 2/2008 | Sykes | B23K 26/146 219/121.84 |
| 2008/0067159 A1* | 3/2008 | Zhang | B23K 26/389 219/121.84 |
| 2008/0087640 A1* | 4/2008 | Miyairi | B23K 26/142 216/65 |
| 2008/0308538 A1* | 12/2008 | Harris | B23K 26/34 219/121.84 |
| 2009/0084765 A1* | 4/2009 | Muratsubaki | B23K 26/146 219/121.67 |
| 2009/0120917 A1* | 5/2009 | Koch | B23K 26/125 219/121.78 |
| 2009/0314753 A1* | 12/2009 | Kosmowski | B23K 26/147 219/121.72 |
| 2010/0044353 A1* | 2/2010 | Olsen | B23K 26/38 219/121.67 |
| 2010/0064986 A1* | 3/2010 | Kiyama | F22B 21/26 431/190 |
| 2010/0108648 A1* | 5/2010 | Koseki | B26F 3/004 219/121.67 |
| 2010/0163539 A1* | 7/2010 | Fukushima | B23K 26/0823 219/121.72 |
| 2010/0187209 A1* | 7/2010 | Miyazaki | B23K 26/38 219/121.84 |
| 2010/0217060 A1* | 8/2010 | Minehara | G21F 9/28 588/1 |
| 2010/0282725 A1* | 11/2010 | Johnson | B23K 26/123 219/121.67 |
| 2010/0301013 A1* | 12/2010 | Conneely | B23K 26/127 216/83 |
| 2011/0095002 A1* | 4/2011 | Katayama | B23K 26/244 219/121.61 |
| 2011/0210109 A1* | 9/2011 | Szelagowski | B23K 26/1476 219/121.72 |
| 2012/0175354 A1* | 7/2012 | Abbasi | B23K 26/702 219/121.84 |
| 2013/0298387 A1* | 11/2013 | Kobier | B23K 26/146 29/623.1 |
| 2014/0034614 A1* | 2/2014 | Sbetti | B23K 26/0622 219/74 |
| 2014/0154871 A1* | 6/2014 | Hwang | B23K 26/146 438/463 |
| 2014/0251962 A1* | 9/2014 | Alfille | B23K 26/1437 219/121.72 |
| 2015/0165559 A1* | 6/2015 | Gaebelein | B23K 26/1462 219/121.67 |
| 2015/0352667 A1* | 12/2015 | Hemes | B23K 26/144 219/121.61 |
| 2016/0101483 A1* | 4/2016 | Kawada | B23K 26/1462 219/121.63 |
| 2016/0121427 A1* | 5/2016 | Montello | B23K 26/21 219/121.63 |
| 2016/0129527 A1* | 5/2016 | Moon | B23K 26/16 425/174.4 |
| 2016/0325378 A1* | 11/2016 | Ohno | B23K 26/16 |
| 2016/0368090 A1* | 12/2016 | Gaebelein | B29D 30/0606 |
| 2017/0043432 A1* | 2/2017 | Yoshii | B23K 26/361 |
| 2017/0120392 A1* | 5/2017 | Orlandi | B23K 26/703 |
| 2017/0182593 A1* | 6/2017 | Richerzhagen | B23K 26/702 |
| 2017/0232558 A1* | 8/2017 | Kano | B23K 26/0861 219/121.72 |
| 2017/0259377 A1* | 9/2017 | Ohno | B23K 26/144 |
| 2017/0334022 A1* | 11/2017 | Ciambra | B23K 26/1476 |
| 2018/0093347 A1* | 4/2018 | Obara | B05B 1/24 |
| 2018/0147667 A1* | 5/2018 | Lin | B23K 26/142 |
| 2018/0200832 A1* | 7/2018 | Izumi | B23K 26/1436 |
| 2018/0200833 A1* | 7/2018 | Izumi | B23K 26/1464 |
| 2018/0315627 A1* | 11/2018 | Ito | B23K 26/354 |
| 2018/0354072 A1* | 12/2018 | Gabelein | B23K 26/146 |
| 2020/0361032 A1* | 11/2020 | Opitz | B23K 26/1476 |

FOREIGN PATENT DOCUMENTS

| | | | |
|---|---|---|---|
| JP | 2004148360 A | | 5/2004 |
| JP | 6425678 B2 | | 11/2018 |
| WO | 2015110887 A1 | | 7/2015 |

OTHER PUBLICATIONS

International Search Report and Written Opinion, from from PCT/EP2020/053778 filed Feb. 13, 2020, dated Jun. 9, 2020.

* cited by examiner

GAS GUIDE, LASER CUTTING HEAD AND LASER CUTTING MACHINE

The invention relates to a gas guide for a laser cutting head, a laser cutting head, and a laser cutting machine having a laser cutting head. In particular, the invention relates to a gas guide according to claim 1, a laser cutting head according to claim 13, and a laser cutting machine according to claim 14.

A machine tool is used to manufacture and machine workpieces using tools. As machine tools, for example, laser processing machines, in particular laser cutting machines are considered here. In addition, laser processing machines can also be used for engraving, structuring, welding, heat treating as well as, for example, surface layer hardening and coating, as well as for volume-building processes such as rapid prototyping or selective sintering.

A cutting gas feed for feeding a cutting gas is provided in laser processing machines. A cutting gas feed has one or more external connections for connection to a gas source, and a plurality of channels or cut-outs on the inside for guiding and distributing the cutting gas. The cutting gas supports the burning process during flame cutting (with oxygen as the cutting gas), and the outflow of slag during fusion cutting.

The cutting quality depends, among other things, on the gas flow. In this way, turbulence or eddies in the gas flow can generate disturbances at the cutting edge.

The object of the invention is to avoid the disadvantages of the prior art and to provide an improved gas guide. Alternative objects are to provide an improved laser cutting head or an improved laser cutting machine.

These objects are achieved by a gas guide according to claim 1, a laser cutting head according to claim 13 and a laser processing machine according to claim 14, respectively.

The gas guide according to the invention for a laser cutting head having a nozzle, having a central flow axis, comprises a base part having a pressure chamber concentrically surrounding the flow axis, configured for the reception of a gas flow, wherein the base part has at least four gas conduits, which extend from the pressure chamber in the direction of the flow axis, and wherein the cross-sections of the pressure chamber and the gas conduits are dimensioned such that the gas has a maximum flow rate when it exits the gas conduits.

The gas guide according to the invention has a continuous cross-section optimisation of the gas or fluid path. This has the advantage of an optimised gas or fluid flow, in which turbulence or eddies are avoided. In this way, the gas or fluid reaches its maximum flow rate when it exits the guide into a nozzle interior, into which the laser beam extends. The speed of the gas or fluid can be increased continuously by the gas guide during progress. For the sake of clarity, the expression gas shall be used henceforth; other fluids are also encompassed. The pressure chamber can be formed as a ring and, in conjunction with the gas conduits, serves to deflect the gas flow in the direction of the flow axis. The gas conduit can be seen as a channel, e.g. a delimited space having an elongated form for guiding the gas or fluid flow.

The optimisation of the flow has the advantage that losses in the gas flow are minimised, which means that more energy is available for the cutting process. In addition, the cutting quality can be improved, and/or the cutting rate increased.

It can be provided that at least two gas flow channels are provided between the pressure chamber and at least one gas inlet, wherein the at least two gas flow channels open tangentially and/or radially into the pressure chamber. The division into a plurality of, preferably a total of four to eight, gas flow channels allows a more precise distribution of the gas flow into the pressure chamber. The gas flow channels may include or consist of a delimited space having an elongated form for guiding the gas or fluid flow.

It can further be provided that a gas-conducting element is provided between the at least two gas flow channels. The gas-conducting element can, for example, have a tip or edge arranged between two gas flow channels in order to guide the flow to the gas flow channels. Depending on the number of gas flow channels, a plurality of gas-conducting elements can be provided. The gas-conducting element may define a part of the channels. Further, the gas-conducting element may divide the channels. The gas-conducting element may divide the gas inlet into the gas flow channels.

It can be provided that the cross-sections of the at least two gas flow channels, of the gas inlet, of the pressure chamber and the gas conduits are dimensioned such that the gas has a maximum flow rate when it exits the gas conduits. In the case of existing gas flow channels, these are also optimised in the cross-section in order to achieve an optimised gas guide.

It can further be provided that the pressure chamber has a continuous recess, two recesses comprising areas connected to an equalisation port, or four mutually separate recesses. The division or subdivision of the pressure chamber can further optimise the gas guide. When the gas flows into the pressure chamber, the flow must split into two directions. If gas is introduced into the pressure chamber from two sides, disturbances will occur when the two gas flows meet. If this meeting takes place within the pressure chamber, the effects are smaller. Thus, there should be a partition or a web in this area. This supporting geometry means there is less turbulence.

It can be provided that at least two gas flow channels open into each recess. This arrangement supports the disturbance-reduced inflow of the gas from the gas flow channels into the chamber.

It can further be provided that at least four to twenty-four, preferably twenty-two, gas conduits are provided. It has been shown that this number of gas conduits allows an optimised distribution of the entire gas flow. A higher number of gas conduits may be provided.

It can be provided that the gas conduits are arranged concentrically around the flow axis. It has been shown that this arrangement of the gas conduits allows an optimised distribution of the gas flow. If the pressure chamber is divided into a plurality of recesses or areas, which can be realised, for example, by means of webs located therebetween, the concentric arrangement can be maintained.

It can further be provided that a concentrically circumferential equalising channel adjoins the gas conduits. This equalising channel, which may have the shape of a concentric ring segment, is where the outlets of the gas conduits open into. The individual flows of the gas conduits meet accordingly in the equalising channel, as a result of which they are combined, which results in a calmer overall flow.

It can be provided that the gas conduits and/or the equalising channel each have an outflow port, wherein an outer contour of the equalising channel remote from the flow axis and/or the outflow port extends at a decreasing angle with respect to the flow axis. The decreasing angle allows the Coanda effect to build up, which favours the flow guide, since the gas flow is basically drawn further along the contour of the equalising channel or along the contour of the gas conduit.

It can be provided that the cross-sections of the at least two gas flow channels, of the pressure chamber, of the gas conduits and the equalising channel or of the pressure chamber, the gas conduits and of the equalising channel are dimensioned such that the gas has a maximum flow rate when it exits the equalising channel in the area of the outflow port. In the case of an existing equalising channel and/or existing gas inlets, these can also be optimised in the cross-section in order to achieve an optimised gas guide.

It can further be provided that the gas guide has an upper part and a lower part, wherein the pressure chamber, the gas conduits and/or the equalising channel are formed between the upper part and the lower part. This construction allows simple manufacturing, where, for example, the pressure chamber and the gas conduits may be milled. Alternatively, a one-piece construction can be provided, the production of which would be possible, for example, using additive manufacturing or rapid prototyping.

A laser cutting head according to the invention for a laser cutting machine comprises a laser feed, a nozzle, and a gas guide as described above. Otherwise the same advantages and modifications apply as described above.

A laser cutting machine according to the invention comprises a laser cutting head as described above and/or a gas guide as described above. The same advantages and modifications apply as described above.

Further preferred embodiments of the invention will become apparent from the remaining features mentioned in the dependent claims.

The various embodiments of the invention mentioned in this application can, unless otherwise stated in individual cases, be advantageously combined with one another.

The invention will be explained below in exemplary embodiments with reference to the accompanying drawings. In the figures:

FIG. 5 shows an enlarged detail of FIG. 4, and FIG. 6 a schematic perspective view of a laser cutting machine having a laser cutting head.

Figure 1:
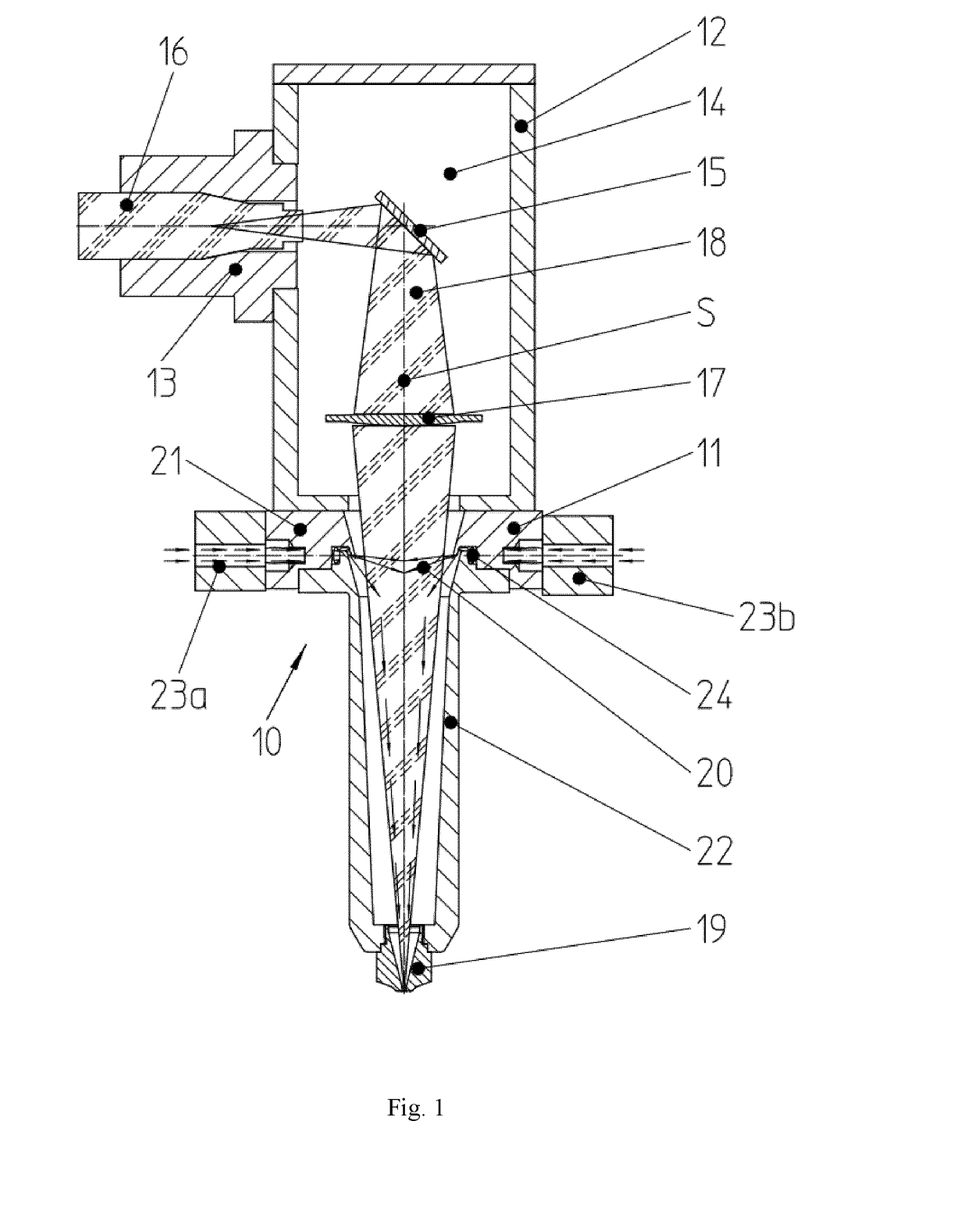
FIG. 1 shows a sectional view of a laser cutting head having a gas guide.

FIG. 1 shows a sectional view of a laser cutting head 10 having a gas guide 11. Such laser cutting heads 10 are used, for example, in laser cutting machines.

The laser cutting head 10 has a base body 12 with an interior 14, which is designed as a clean room. A laser source 16, for example, a fibre laser, is attached to the outside of the base body 12 and produces a laser beam 18 directed into the interior 14. Alternatively, reference numeral 16 can denote a coupling member, with which a laser beam of an external laser source exits. The coupling member may be, for example, a fibre plug having an end cap.

The laser beam 18 enters the interior 14 via a fibre bushing 13. The laser beam 18 further extends to a deflecting element 15 such as a mirror. The deflected laser beam 18 passes through a lens 17. Finally, the laser beam 18 leaves the interior 14 through the base body 12. The laser beam 18 then enters the gas guide 11, where it meets a gas flow 20. The laser beam 18 leaves the gas guide 11 and thus the laser cutting head 10 through the nozzle or nozzle electrode 19.

The gas guide 11 here consists of a plurality of parts, consisting at least of one upper part 21, one or a plurality of gas inlets 23a and 23b, at least one pressure chamber 24 and at least one lower part 22. By changing the geometry of the upper part 21 and the lower part 22 and the position and number of the gas inlets 23a and 23b, the gas flow 20 can be positively influenced for the cutting process. The pressure chamber 24, which can be divided into a plurality of recesses or areas, can be formed by the upper part 21 and the lower part 22.

The gas guide 11 is axis symmetrical and/or rotationally symmetrical with respect to a flow axis S. The flow axis S corresponds to the optical axis of the laser beam 18 in the area of the lower part and indicates the central axis of the gas flow in the direction of the nozzle electrode 19. The two gas inlets 23a and 23b are arranged concentrically with respect to flow axis S. In the gas guide 11, the gas flow, which is initially radial in the gas inlets 23a and 23b, is deflected into an axial gas flow.

Figure 2:
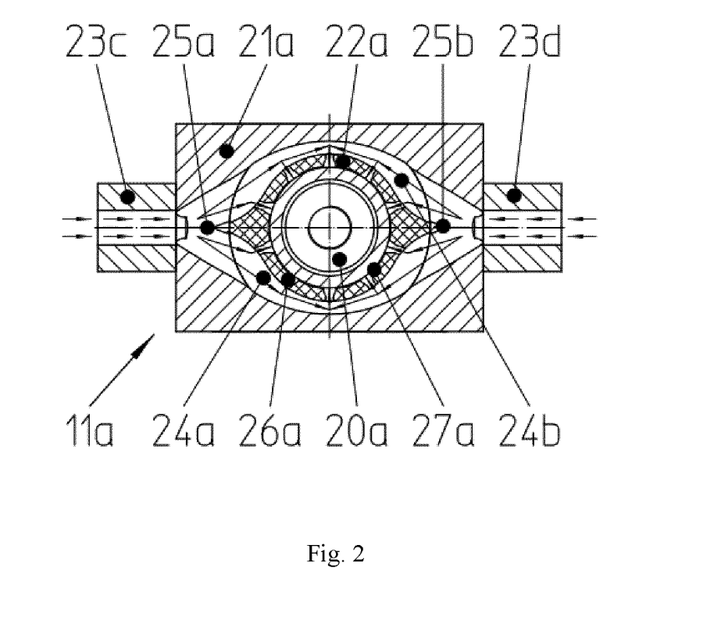
FIG. 2 shows a further sectional view of a gas guide according to a first embodiment.

FIG. 2 shows a sectional view of a gas guide 11a according to a first exemplary embodiment. The sectional view is perpendicular to the sectional view of FIG. 1, so that the flow axis is a surface normal to the sheet plane.

Here, the upper part 21a and the lower part 22a as well as the gas flow channels 25a and 25b are shaped such that the gas flow 20a, which flows through the gas inlets 23c and 23d, does not strike a surface frontally, but rather flows, in a flow-optimised manner, into a pressure chamber or into at least two areas or recesses 24a and 24b of the pressure chamber. The gas flow 20a can calm down in the pressure chamber, ensuring fewer eddies. The gas is guided to the nozzle 19 along the wall in the downward-oriented manner via at least four gas conduits 26a—ten gas conduits 26a in the example shown—and at least one equalising channel 27a. The equalising channel 27a is formed concentrically around the flow axis.

Figure 3:
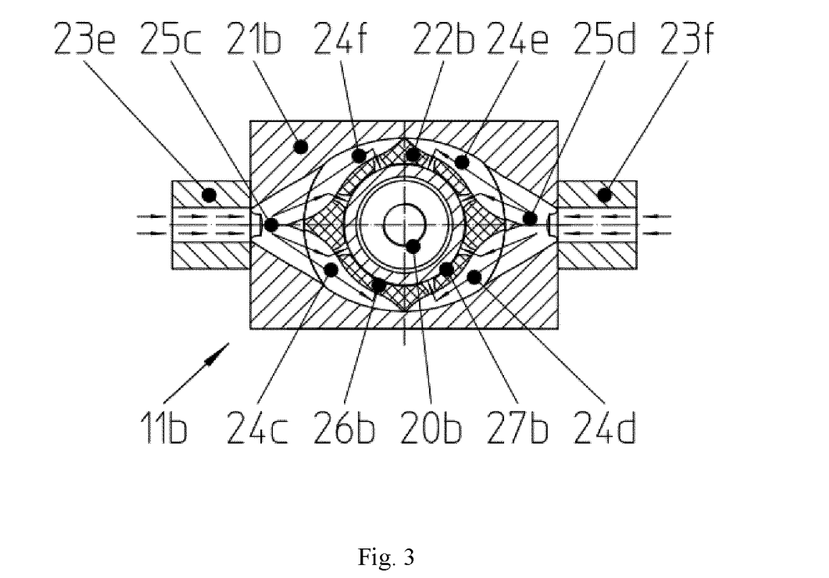
FIG. 3 shows a sectional view of a gas guide according to a second embodiment.

FIG. 3 shows a sectional view of a gas guide 11b according to a second exemplary embodiment. Here, the upper part 21b and the lower part 22b as well as the gas flow channels 25c and 25d are shaped such that the gas flow 20b, which flows through the gas inlets 23e and 23f, does not strike a surface frontally, but rather flows, in a flow-optimised manner, into, in this case four, pressure chambers 24c, 24d, 24e and 24f, where the gas flow 20b is able to calm down, thus ensuring fewer eddies. The gas flow channels 25c and 25d here each comprise four subchannels, between which a gas-conducting element is provided in the form of a flow divider. The gas is guided to the nozzle 19 along the wall in the downward-oriented manner via at least four gas conduits 26b—eight gas conduits 26b in the example shown—and at least one equalising channel 27b. A plurality of gas conduits 26b thus open or merge into an equalising channel 27b.

Figure 4:
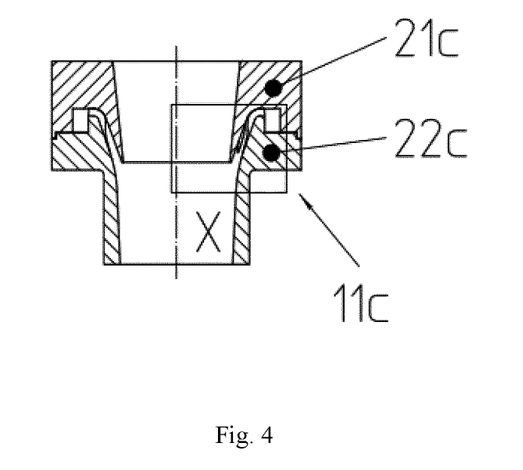
FIG. 4 shows a sectional view of a gas guide.

FIG. 4 shows a sectional view of the gas guide 11c according to the first and second exemplary embodiments, having the upper part 21c and the lower part 22c.

Figure 5:
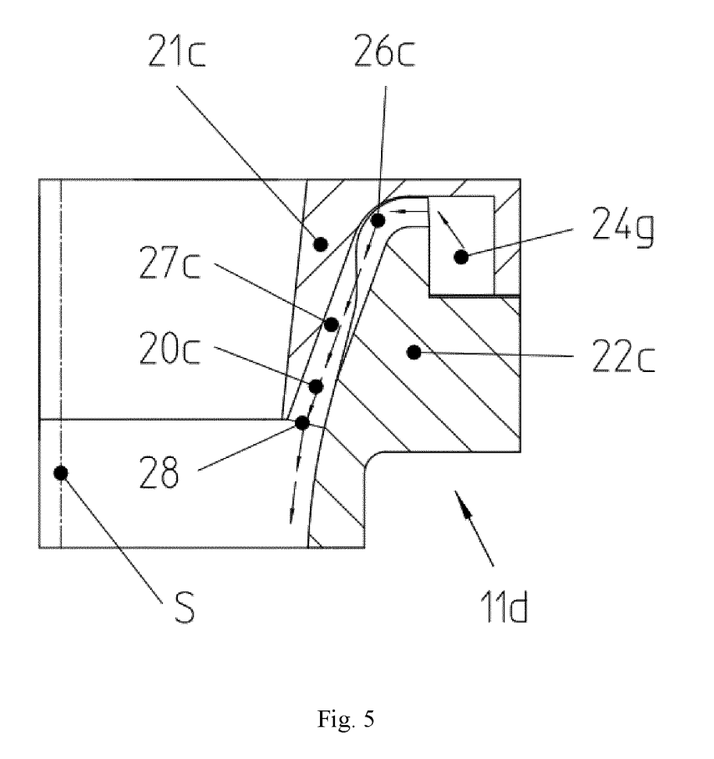

FIG. 5 shows an enlarged detail of area X of FIG. 4. The function of the gas flow 20c, which flows from the pressure chamber 24g into the equalising channel 27c via the gas conduit 26c, is described with reference to FIG. 5. Directed in this way, the gas flow 20c flows to the nozzle 19 along the wall of the lower part.

The gas flow 20c is first guided into the pressure chamber 24g via a plurality of gas inlets (not shown here). This feed can extend perpendicular, that is to say radially, or essentially perpendicular to flow axis S. The gas inlets can also run into the pressure chamber 24g at an angle. The gas flow 20c extends into the gas conduit 26c starting from the pressure chamber 24g. At least four gas conduits are provided, one gas conduit 26c of which is shown.

The gas conduits can each be formed between two ribs. The ribs and the gas conduits first extend in a radial direction and then in an increasingly axial direction towards the nozzle or towards a workpiece.

The gas conduits 26c then merge into the equalising channel 27c, which is formed concentrically around flow axis S. The equalising channel 27c comprises an outflow port 28 at its lower edge in the flow direction. The gas conduits 26c and the equalising channel 27c, or its outer contour remote from flow axis S, extend at a, preferably continuously, changing angle with respect to flow axis S. The angle with respect to flow axis S decreases in flow direction, that is from top to bottom. In other words, the angle gets increasingly shallower. This design results in no torsion being generated with respect to flow axis S. If there is no equalising channel, the gas conduits each have a corresponding outflow port. The outflow port 28 is formed in a convex manner for the gas flow 20c on the radially outer side.

This design of the equalising channel 27c or the outflow port 28 leads to the formation of the Coanda effect, which favours the flow guide, since the gas flow 20c is basically drawn further along the contour of the equalising channel 27c or along the contour of the gas conduit 26c.

The cross-sections of the at least two gas flow channels 25a, 25b, 25c, 25d, of the connection and the gas inlets 23a and 23b, respectively, of the pressure chamber 24, the gas conduits 26a, 26b and of the equalising channel 27c are dimensioned such that the gas or gas flow 20d has a maximum flow rate at the outflow port 28 from the equalising channel 27c and the gas conduits 26a, 26b, respectively.

The cross-sections are not considered individually, for example, per gas conduit, but as a whole, that is for all gas conduits. Accordingly, the cross-section of the gas conduits is derived by multiplying the number of gas conduits with the respective individual cross-sections. The smallest cross-section is in the area of the outflow port 28.

Figure 6:
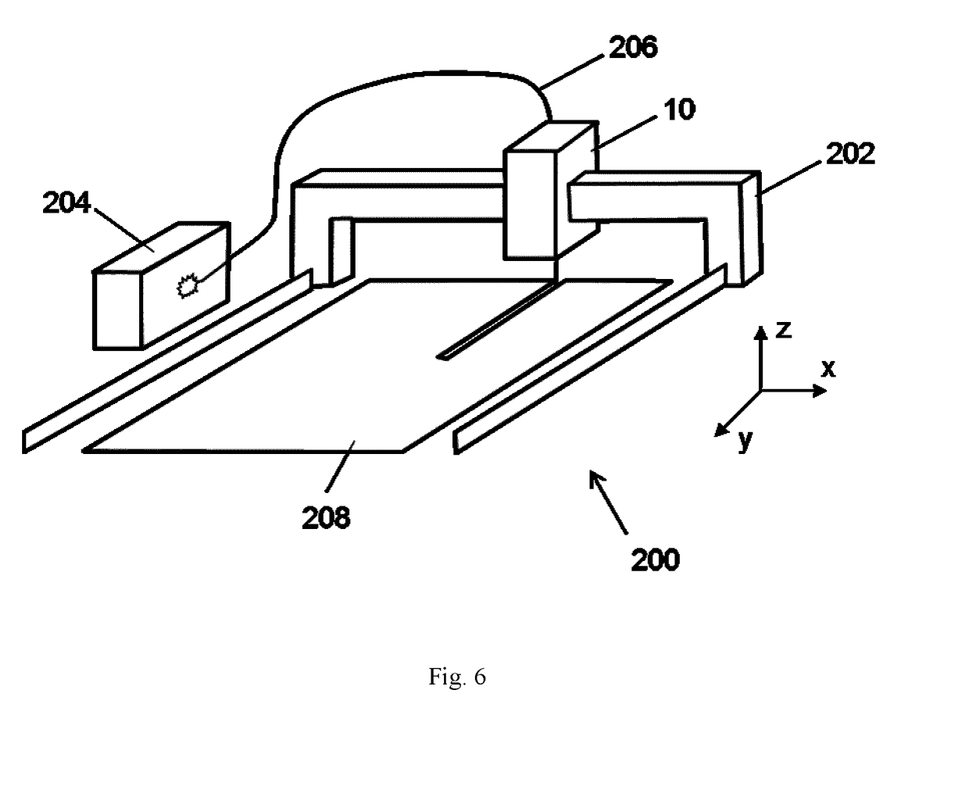

FIG. 6 shows a schematic perspective view of a laser cutting machine 200 having a laser cutting head 10. The laser cutting head 10 is arranged on a movable bridge 202, so that it can be moved in at least the x and y directions. A laser source 204 generates laser light and feeds it to the laser cutting head 10 via an optical fibre. A workpiece 208, for example a sheet, is cut by the laser beam.

The gas guide 11 presented here, or the laser cutting head 10 equipped therewith, or the laser cutting machine 200 equipped therewith, allows flow-mechanically optimised gas flow, as a result of which gas consumption can be reduced, and cutting quality and/or cutting rate improved.

The invention claimed is:

1. A gas guide for a laser cutting head having a nozzle having a central flow axis, comprising:
a base part having a pressure chamber concentrically surrounding the central flow axis, and configured to receive a gas flow,
wherein the base part has at least four gas conduits, which communicate with the pressure chamber, and
wherein dimensions of the cross-sections of the pressure chamber and of the at least four gas conduits are configured such that the gas has a maximum flow rate when a gas exits the at least four gas conduits,
wherein the at least four gas conduits each extend from the pressure chamber in a flow direction of the gas flow to a gas conduit terminal end within the base part at a decreasing angle with respect to the central flow axis,
wherein an outer contour of an equalizing channel, remote from the central flow axis, extends from the at least four gas conduits in the flow direction of the gas flow at a decreasing angle with respect to the central flow axis.

2. The gas guide according to claim 1, wherein at least two gas flow channels are provided between the pressure chamber and at least one gas inlet, wherein the at least two gas flow channels open tangentially and/or radially into the pressure chamber.

3. The gas guide according to claim 2, wherein a gas-conducting element is provided between the at least two gas flow channels.

4. The gas guide according to claim 2, wherein dimensions of the cross-sections of the at least two gas flow channels, of the gas inlet, of the pressure chamber, and of the at least four gas conduits are configured such that the gas has a maximum flow rate when the gas exits the at least four gas conduits.

5. The gas guide according to claim 1, wherein the pressure chamber comprises (i) a continuous recess, (ii) two recesses comprising areas connected with an equalization port, or (iii) four mutually separate recesses.

6. The gas guide according to claim 2, wherein the at least two gas flow channels open into each recess.

7. The gas guide according to claim 1, wherein at least four to twenty-four gas conduits are provided.

8. The gas guide according to claim 1, wherein the at least four gas conduits are arranged concentrically around the central flow axis.

9. The gas guide according to claim 1, wherein dimensions of the cross-sections of the at least two gas flow channels, of the pressure chamber, of the at least four gas conduits and of the equalizing channel or of the pressure chamber, the at least four gas conduits and of the equalizing channel are configured such that the gas has a maximum flow rate in the area of the outflow port.

10. The gas guide according to claim 1, wherein the gas guide has an upper part and a lower part, wherein the pressure chamber, the at least four gas conduits and/or the equalizing channel are formed between the upper part and the lower part.

11. A laser cutting head for a laser cutting machine, wherein a laser feed, a nozzle and a gas guide according to claim 1 are provided.

12. A laser cutting machine having a laser cutting head according to claim 11.

13. A laser cutting machine comprising:
a laser cutting head comprising a nozzle having a central flow;
a gas guide for the laser cutting head comprising:
a base part having a pressure chamber concentrically surrounding the central flow axis and configured to receive a gas flow,
wherein the base part has at least four gas conduits, which communicate with the pressure chamber, and
wherein dimension of the cross-section of the pressure chamber and of the at least four gas conduits are configured such that the gas has a maximum flow rate when a gas exits the at least four gas conduits,
wherein the at least four gas conduits each extend from the pressure chamber in a flow direction of the gas flow to a gas conduit terminal end within the base part at a decreasing angle with respect to the central flow axis.

14. A gas guide for a laser cutting head having a nozzle having a central flow axis, comprising:
- a base part having a pressure chamber concentrically surrounding the central flow axis, the base part being configured to receive a gas flow,
- wherein the base part has at least four gas conduits, which communicate with the pressure chamber, and
- wherein the dimensions of cross-sections of the pressure chamber and of the at least four gas conduits are configured such that the gas has a maximum flow rate when a gas exits the at least four gas conduits,
- wherein the at least four gas conduits each extend from the pressure chamber in a flow direction of the gas flow at a decreasing angle with respect to the central flow axis,
- wherein a concentrically circumferential equalizing channel adjoins the gas conduits, and
- wherein at least two gas flow channels are provided between the pressure chamber and at least one gas inlet, wherein the at least two gas flow channels open tangentially and/or radially into the pressure chamber.

* * * * *